UNITED STATES PATENT OFFICE.

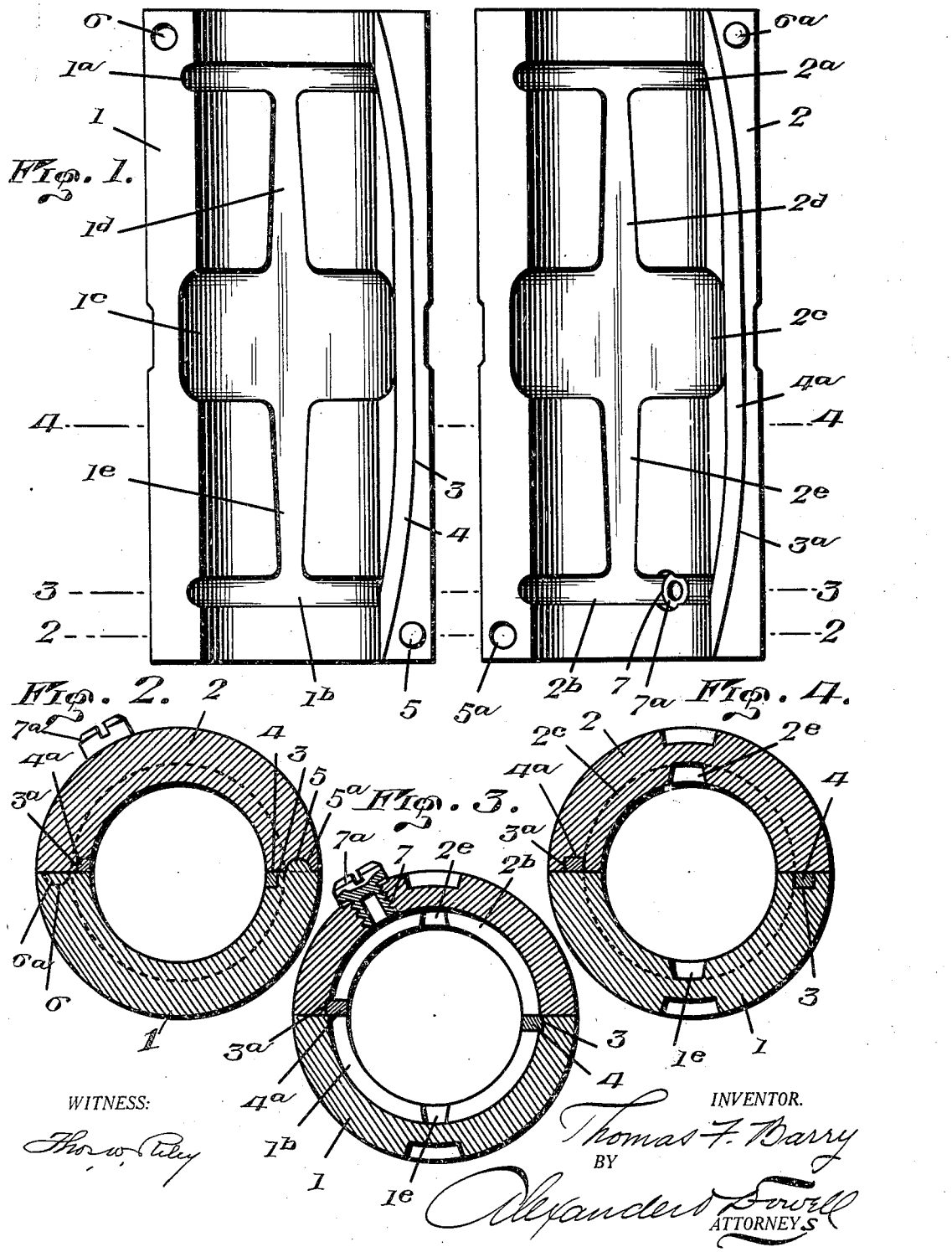

THOMAS F. BARRY, OF MUSCATINE, IOWA, ASSIGNOR TO BARRY COMPANY, OF MUSCATINE, IOWA, A CORPORATION OF IOWA.

SPLIT LOOSE PULLEY BUSHING.

1,421,377. Specification of Letters Patent. Patented July 4, 1922.

Application filed January 27, 1920. Serial No. 354,451.

*To all whom it may concern:*

Be it known that I, THOMAS F. BARRY, a citizen of the United States, residing at Muscatine, in the county of Muscatine and State of Iowa, have invented certain new and useful Improvements in Split Loose Pulley Bushings; and I hereby declare that the following is a full, clear, and exact description thereof, reference being had to the accompanying drawings, which form part of this specification.

This invention relates to bushings for loose pulleys or split pulleys which are ordinarily applied to line shafts after the latter are in place. Heretofore loose pulley bushings have been made in various forms, but usually they are cast as a whole in cylindric form with a groove on each side and afterwards split or cut into halves when they are to be used on shafts where it is not convenient to slip the bushings on endwise over the shaft; as is generally the case on line shafting, or where the shafts are already mounted in bearings. When cylindric bushings are cast as a whole they are difficult to cleanse. Generally such bushings are cleaned in tumbling barrels in foundries and the sand used in coring the interior of the bushings to form oil channels is difficult to remove. Another objection to such whole bushings is that they frequently split or fracture, and then are not oil tight; and unless oil tight bushings are fatally objectionable.

The object of the present invention is to overcome the objection to the heretofore known and made types of loose pulley bushings, and to provide a split loose pulley bushing made in complemental longitudinal sections, each provided with oil channels or passages, and with means for ensuring their accurate alinement or registration, and also with means to direct oil to the end of the bushing without wasting the oil.

In the accompanying drawings I have illustrated one practical form of a split bushing embodying the invention and will describe the same with reference thereto and then summarize in the claims the essentials of the invention and novel features thereof for which protection is desired.

In said drawings:

Fig. 1 is an internal face view of the complemental halves of my split bushing side by side.

Fig. 2 is a transverse section of the bushing assembled on the line 2—2, Fig. 1.

Fig. 3 is a similar section on the line 3—3, Fig. 1.

Fig. 4 is a similar section on the line 4—4, Fig. 1.

The bushing is formed of two similar complemental sections 1 and 2, each of which is semi-circular in cross section, and when these halves are put together they form a complete cylinder (see Fig. 2), having a bore corresponding to the diameter of the shaft on which the pulley is to be mounted, and having an exterior diameter corresponding to the bore of the hub of the pulley in which the bushing is to be used. The bushing is usually made longer than the hub so that it may project therefrom to permit introduction of oil into the bushing, as hereinafter explained.

The section 1 is provided with longitudinal transverse oil grooves $1^a$, $1^b$ adjacent its ends, and with an intermediate oil chamber or larger transverse groove $1^c$, which forms an oil reservoir; and the end grooves are connected with the intermediate groove by longitudinal channels $1^d$ and $1^e$.

The section 2 is similarly provided with transverse interior oil grooves $2^a$, $2^b$; intermediate larger groove $2^c$; and longitudinal channels $2^d$ and $2^e$, connecting the end grooves with the central groove. The grooves in each section of the bushing are alike, and when the sections are put together, as in Figs. 2–4, the transverse grooves in each section register with the transverse grooves in the other section, and these together form complete annular oil grooves or channels within the bushing.

The section 1 is provided in one of its meeting faces, at one side with a longitudinal groove or recess 3, which preferably extends the entire length of the bushing and communicates with the central groove $1^c$, and both end grooves $1^a$, $1^b$; and this channel preferably extends beyond the grooves $1^a$, $1^b$, to the ends of the part 1, the channel tapering off or narrowing as it approaches the ends of the section, and the inner wall of the groove 3, disappearing between the channels 1ª and 1ᵇ and the outer ends of the section.

Fitted in this groove 3 is a packing 4 preferably formed of a piece of reed or fibrous cane, but may be of other suitable material, which projects slightly above or beyond the meeting surface of the section 1, and is adapted to contact with the opposed plane surface of the section 2, as shown in Figs. 2–4, when the parts are assembled.

The section 2 is preferably provided in one meeting face with a channel 3ª (corresponding to channel 3 in part 1) which communicates with the transverse grooves 2ª, 2ᵇ, 2ᶜ, and extends beyond the grooves 2ª, 2ᵇ to the ends of the section 2; the inner wall of the channel 3ª disappearing exterior to the grooves 2ª, 2ᵇ. In the channel 3ª is a packing 4ª similar to the packing 4.

When the sections 1 and 2 are placed in position around a shaft the packings 4 and 4ª in the sections 1 and 2 lie at opposite sides of the shaft so that when the sections of the split bushing are clamped tightly together the packings 4 and 4ª will oil-tightly close the joints between the opposed sections of the bushing.

To ensure proper and accurate registration of the sections 1 and 2 when placed around a shaft, the section 1 has a registering projection 5 near one end of one meeting face and a recess 6 near the other end of its other meeting face. The section 2 has a recess 5ª near one end of one meeting face which is adapted to engage and fit the projection 5 of the section 1 (see Fig. 2). The section 2 has a projection 6ª near the other end of its other meeting face adapted to enter the recess 6 in the section 1 when the parts 1 and 2 are properly positioned (see Fig. 2). These interlocking projections and recesses 5, 5ª; 6, 6ª accurately aline the sections 1 and 2 when such sections are placed together around a shaft; and they also prevent longitudinal and lateral displacement of the sections when they are clamped together. The projections may be formed of hard metal balls which may be secured in position in the casting of the sections.

Lubricant may be supplied to the channels in the interior of the bushing by suitable means; a radial feed hole 7 being shown in the upper section 2, which may be closed by a screw plug 7ª in the usual manner.

Some of the advantages of this form of bushing are; the facility with which it can be applied; the certainty with which the sand can be cleaned out of the interior oil channels after the casting operation; the certainty of accurate fitting of the two sections, the meeting faces of which may be ground to a nicety; the prevention of leakage of oil by the longitudinal packings 4, 4ª; and an ample supply of oil to all the bearing surfaces; and the prevention of leakage between the sections.

What I claim is:

1. A split bushing for pulleys, comprising opposite similar complemental interchangeable sections each having one inner meeting edge smooth and having in its other meeting edge a longitudinal channel to receive a packing; the packing on one section contacting with the smooth meeting edge of the opposed section when the parts are assembled, whereby leakage of the oil between the meeting faces of such sections is prevented by such packings.

2. A split bushing for pulleys, comprising two semi-cylindric complemental interchangeable sections each section having transversely disposed internal grooves, and each section having one meeting edge smooth and having in its other meeting edge a longitudinal channel for the reception of packing; and packings in said channels, the packing on one section contacting with the smooth meeting edge of the opposed section, and the grooves forming internal annular oil chambers.

3. A loose split pulley bushing as set forth in claim 1, the channel in each section being curved so that its inner wall terminates short of the outer ends of the section, substantially as described.

4. A split bushing for pulleys as set forth in claim 1 having the sections also provided with inter-engaging projections and recesses, whereby the sections are accurately positioned when placed around a shaft and longitudinal and lateral relative movement of the sections is prevented.

5. A split bushing for pulleys, as set forth in claim 1, having the channel in each section curved so that its inner wall terminates short of the outer ends of the section; each section being also provided with inter-engaging projections and recesses whereby the sections are accurately positioned when placed around a shaft and longitudinal and lateral relative movement of the sections is prevented.

6. A loose split pulley bushing as set forth in claim 2, each section having transverse grooves near its ends communicating with the channel; the inner wall of the channel terminating adjacent the grooves, substantially as described.

7. A split bushing for pulleys as set forth in claim 2, the sections also provided with inter-engaging projections and recesses whereby the sections are accurately positioned when placed around a shaft and longitudinal and lateral relative movement of the sections is prevented, 8. A split bushing for pulleys, as set forth in claim 2, having the channels communicating with the transverse grooves and the inner wall of each channel terminating adjacent the outermost grooves; the sections being further provided with inter-engaging projections and recesses whereby the sections are accurately positioned when placed around a shaft, and longitudinal and lateral relative movement of the sections is prevented.

In testimony that I claim the foregoing as my own, I affix my signature.

THOMAS F. BARRY.